(12) United States Patent
Gayney et al.

(10) Patent No.: US 9,291,479 B2
(45) Date of Patent: Mar. 22, 2016

(54) PLASTIC SPEED TARGET WHEEL AND METHOD OF MANUFACTURE

(75) Inventors: Jack M. Gayney, Wixom, MI (US); Kevin A. Shipley, Howell, MI (US); Apoorva S. Kelkar, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 365 days.

(21) Appl. No.: 13/206,963

(22) Filed: Aug. 10, 2011

(65) Prior Publication Data

US 2013/0038319 A1 Feb. 14, 2013

(51) Int. Cl.
| | | |
|---|---|---|
| *G01P 3/48* | (2006.01) | |
| *G01B 7/30* | (2006.01) | |
| *G01D 5/14* | (2006.01) | |
| *G01P 3/488* | (2006.01) | |
| *G01P 3/487* | (2006.01) | |

(52) U.S. Cl.
CPC ............... *G01D 5/147* (2013.01); *G01P 3/488* (2013.01); *G01D 5/145* (2013.01); *G01P 3/487* (2013.01)

(58) Field of Classification Search
CPC ......... G01B 7/146; G01P 3/487; G01D 5/145
USPC ................... 324/166, 207.25, 207.2
See application file for complete search history.

(56) References Cited

U.S. PATENT DOCUMENTS

| | | | | |
|---|---|---|---|---|
| 4,121,112 A | * | 10/1978 | Hartig | ............................ 307/106 |
| 5,053,656 A | * | 10/1991 | Hodge | ............................ 324/200 |
| 5,476,272 A | | 12/1995 | Hixson, II | |
| 5,545,368 A | * | 8/1996 | Vinarcik | ........................ 264/437 |
| 6,640,451 B1 | | 11/2003 | Vinarcik | |
| 7,267,016 B2 | | 9/2007 | Pavan | |
| 7,573,260 B2 | | 8/2009 | Kawashima et al. | |
| 2003/0034772 A1 | | 2/2003 | Galvan et al. | |
| 2011/0121823 A1 | | 5/2011 | Bradley | |

FOREIGN PATENT DOCUMENTS

| | | |
|---|---|---|
| DE | 19539047 A1 | 4/1997 |
| DE | 102006049999 A1 | 4/2008 |
| EP | 1120564 A1 | 8/2001 |

\* cited by examiner

*Primary Examiner* — Reena Aurora

(57) ABSTRACT

A speed target wheel includes an annular body portion and a plurality of gear teeth. The annular body portion consists of a plastic material and the plurality of gear teeth project from the annular body portion. Each of the plurality of gear teeth includes a base portion adjacent the annular body portion and a tip portion, where the base portion is integrally formed with the annular body portion and substantially comprises the plastic material, and where the tip portion includes a ferrous region integrally encompassed by the plastic material.

18 Claims, 2 Drawing Sheets

PLASTIC SPEED TARGET WHEEL AND METHOD OF MANUFACTURE

FIELD

The present disclosure relates to target wheels for sensors as used in mechanical devices, and more particularly to plastic target wheels incorporating ferrous material.

BACKGROUND

The statements in this section merely provide background information related to the present disclosure and may or may not constitute prior art.

In mechanical devices such as power transmissions, engines or other machines, efficient control of the operation of the device often relies on a controller receiving data from sensors within the device. A transmission controller, for example, may require the rotational speed of an internal gear, shaft or other rotating member. Typically, this is accomplished using a speed target wheel rotationally secured to such a shaft or member and a sensor targeting the speed target wheel. The speed target wheel is generally ferrous and includes target teeth that are detected by the sensor as they rotate past the sensor. The sensor is positioned to target the radial surface of the teeth of the speed target wheel. Metal target wheels are often heavy, relatively expensive, and may require complex cutting or shaping procedures to create a suitable target.

Accordingly, there is a need for a lightweight and relatively inexpensive speed target wheel.

SUMMARY

A speed target wheel includes an annular body portion and a plurality of gear teeth. The annular body portion consists of a plastic material and the plurality of gear teeth project from the annular body portion. Each of the plurality of gear teeth includes a base portion adjacent the annular body portion and a tip portion, where the base portion is integrally formed with the annular body portion and substantially comprises the plastic material, and where the tip portion includes a ferrous region integrally encompassed by the plastic material.

In another example of the present invention, the ferrous region of the plurality of gear teeth is disposed adjacent an outer radial surface of the tip portion of the plurality of gear teeth.

In yet another example of the present invention, the ferrous region includes a ferrous member.

In yet another example of the present invention, the plurality of gear teeth have a predefined width and the ferrous member has a length that is substantially similar to the predefined width.

In yet another example of the present invention, the ferrous member is substantially cylindrically shaped.

In yet another example of the present invention, the ferrous member is substantially the size of the tip portion of each of the plurality of gear teeth.

In yet another example of the present invention, an outer surface of each ferrous member is partially exposed at an outer radial portion of the speed target wheel at the tip portion of each of the plurality of gear teeth.

In yet another example of the present invention, the ferrous region includes a plurality of ferrous particles interspersed in the plastic material of the plurality of gear teeth.

In yet another example of the present invention, at least a portion of the plurality of ferrous particles is exposed along an outer surface of the gear teeth.

In yet another example of the present invention, the body portion includes a smooth inner surface for press fitting on a shaft.

In yet another example of the present invention, the ferrous region is included in each of the gear teeth in an amount and is disposed at a location that is effective to generate a signal in a Hall effect sensor disposed for reading the movement of the ferrous region.

In yet another example of the present invention a method of manufacturing a speed target wheel is provided. The method includes providing an injection molding form having a body form portion and a tooth form portion for creating an annular speed target wheel, inserting ferrous material into the tooth form portion of the injection molding form, injecting plastic into the injection molding form to create an annular plastic target wheel having gear teeth with embedded ferrous material, and removing the annular plastic target wheel from the injection molding form.

In yet another example of the present invention the method further includes removing an outer portion of the gear teeth to expose the embedded ferrous material.

In yet another example of the present invention the method further includes inserting the ferrous material into the tooth form portion of the injection molding form at an outer radial portion of the injection molding form at the tooth form portion.

Further aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
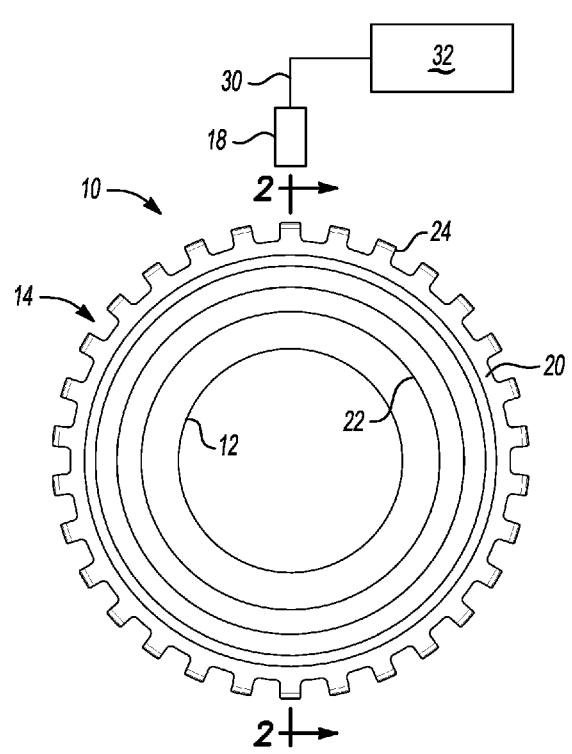
FIG. 1 is a schematic view of an example of a speed sensor assembly according to principles of the present invention.

Referring to the drawings, wherein like reference numbers refer to like components, in FIG. 1 an example of a speed sensor assembly 10 for determining the speed of a shaft 12 is illustrated according to principles of the present invention. The speed sensor assembly 10 includes a speed target wheel 14 rotationally secured to the shaft 12 and a sensor 18 disposed to read the speed target wheel 14. The shaft 12 is generally a shaft, carrier, hub, or other rotating component of a vehicle transmission whose rotational speed is to be measured. The transmission may be automatic, manual, dual clutch, or other types of transmissions without departing from the scope of the present invention. It should be appreciated that the sensor assembly 10 may be used in Power Take Off Units (PTU's), Center & Rear Differentials, and Vehicle Wheel Speed Sensors without departing from the scope of the present invention.

Figure 2:
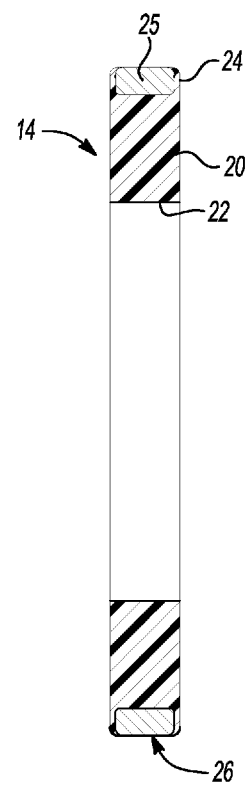
FIG. 2 is a side view of an example of a speed target wheel according to principles of the present invention.
Figure 3:
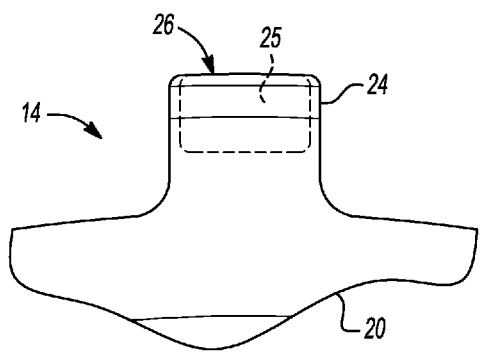
FIG. 3 is an enlarged view of a portion of an example of a speed target wheel according to principles of the present invention.

Referring now to FIGS. 2 and 3, and with continued reference to FIG. 1, the speed target wheel 14 is shown in several views in accordance with principles of the present invention. The speed target wheel 14 generally has a plastic molded body portion 20 and a plurality of gear teeth 24. An inner surface 22 of the body portion 20 is press fit onto the shaft 12 to cause the shaft 12 and the target wheel 14 to rotate at substantially the same speed. In alternative embodiments the inner surface 22 of the target wheel 14 includes splines (not shown) to engage with splines (not shown) formed on the shaft 12. Each of the gear teeth 24 includes a ferrous object or ferrous member 25 and a target surface 26 that faces radially outward from the target wheel 14. The ferrous member defines a ferrous region of each of the gear teeth 24. The ferrous member 25 is at least partially integrally encompassed or surrounded by a plastic that forms the remainder of the gear tooth 24. In the example provided the ferrous member 25 is a cylinder having a diameter of several millimeters and a length of several millimeters and is integrally encompassed by placement in an injection molding form during molding of the target wheel 14, as will be described below. It should be appreciated that other shapes and sizes of objects may be used without departing from the scope of the present invention. The target surface 26 may include a portion of the outer surface of the ferrous member 25. For example, the plastic outer diameter portion of the target wheel 14 may be removed by abrasion, cutting, or other methods to expose a portion of the outer surface of the ferrous member 25 after the target wheel 14 has been molded. In alternative embodiments the outer portion of each gear tooth 24 is retained, and the ferrous member 25 is large enough to alter the field of the sensor 18 through a layer of plastic.

The sensor 18 generally detects changes in a magnetic field to determine when each gear tooth 24 passes by the sensor 18. The sensor 18 is generally fixed or securely attached to a transmission housing (not shown). The sensor 18 actively detects the ferrous member 25 in the target to determine speed. The sensor 18 generates a signal induced by the rotation of the speed target wheel 14 and the ferrous member 25 embedded in each gear tooth 24. The sensor 18 may be of various types and the magnetic field may be generated in various ways without departing from the scope of the present invention. In accordance with one example of the present invention, the sensor 18 is a Hall effect type sensor.

The sensor outputs a signal through a wire 30 that indicates the speed of the target wheel 14. The sensor 18 is positioned within close proximity of the target surface 26 of the target wheel 14. The distance between the speed target wheel 14 and the sensor 18 creates an air gap. The continuous rotation of the speed target wheel 14—and thus the passage of gear teeth 24 past the sensor 18—causes the sensor 18 to detect a continuous change of the magnetic field. The change in the magnetic field in the sensor 18 induces a signal in the wire 30 that is indicative of the speed of the speed target wheel 14 and the shaft 12.

A controller 32 is in electronic communication with the wire 30 to detect the signal current from the sensor 18. The controller 32 is preferably an electronic device having a preprogrammed digital computer or processor, control logic, memory used to store data, and at least one I/O peripheral. However, other types of controllers may be employed without departing from the scope of the present invention.

Figure 4:
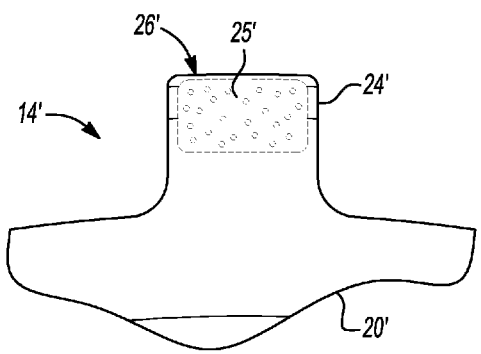
FIG. 4 is an enlarged view of a portion of an example of a speed target wheel according to principles of the present invention.

Referring now to FIG. 4, a portion of an alternative embodiment of a target wheel 14' is shown in accordance with principles of the present invention. The target wheel 14' is substantially similar to the target wheel 14 and may be used with the shaft 12 and the sensor 18 as previously described. The target wheel 14' includes a plastic body portion 20' and a plurality of gear teeth 24'. The gear teeth 24' each include a ferrous region or region of ferrous particles 25'. The ferrous particles 25' are included near an outer diameter of the target wheel 14' and are at least partially exposed on an outer surface 26' of the gear teeth 24'. For example, the region of ferrous particles 25' may be added to a tooth region of a mold for injection molding plastic. The outer surface 26' is preferably ground to expose the ferrous particles 25' after molding the target wheel 14'. The region of ferrous particles 25' alter a magnetic field when passing the sensor 18, which in turn generates a signal indicative of the speed of the target wheel 14' and the shaft 12.

Figure 5:
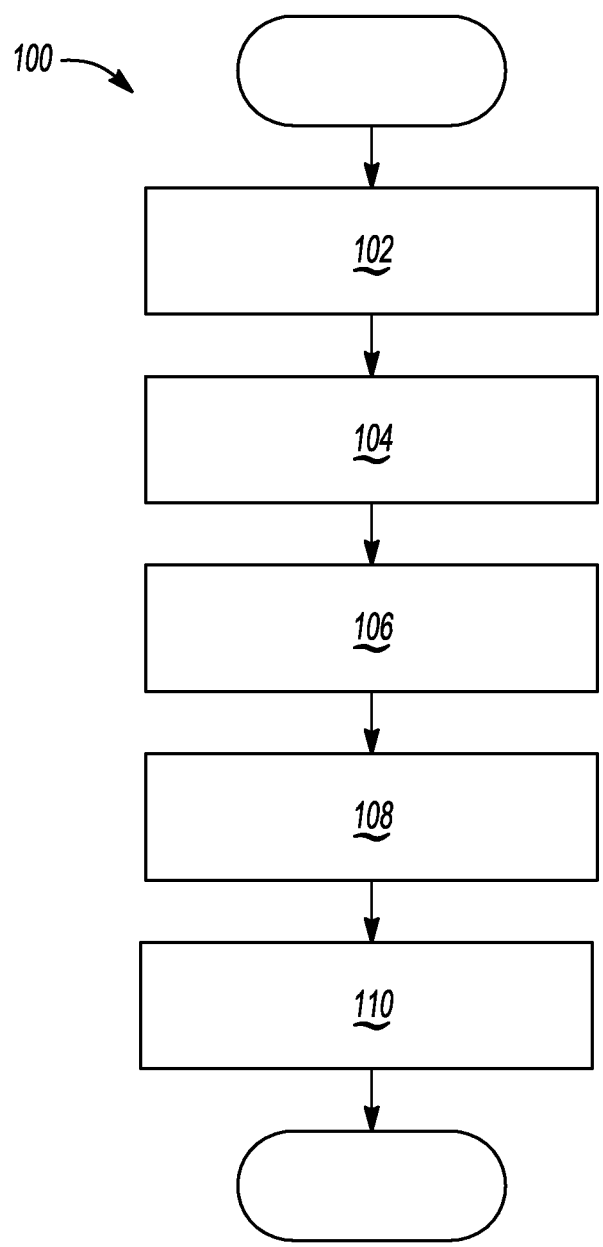
FIG. 5 is a flow chart of an example of a method of manufacturing a speed target wheel according to principles of the present invention.

Referring now to FIG. 5, a method of manufacturing a target wheel is indicated by reference number 100. At step 102 an injection molding form is provided. The injection molding form has a body form portion and a tooth form portion to create a speed target wheel. In step 104, ferrous material is inserted into the tooth form portion of the injection molding form. For example, the ferrous member 25 or the ferrous particles 25' may be inserted into the tooth form portion near an outer diameter of the injection molding form. In one example the ferrous material is positioned in the tooth form portion by magnetizing a portion of the mold.

In step 106, plastic is injected into the injection molding form to create a plastic target wheel. The injection creates a plastic target wheel that has gear teeth with embedded ferrous material. For example, the plastic target wheel may be one of the plastic target wheels 14, 14' having the gear teeth 24, 24', respectively. The plastic target wheel is then removed from the injection molding form in step 108.

In step 110 an outer portion of each gear tooth is removed to expose the ferrous material and create a suitable target for a speed sensor. For example, the outer portion of the gear teeth may be ground through turning or grinding to expose the ferrous material. In alternative embodiments the ferrous material is included in an amount that will suitably alter a sensor's magnetic field through an outer plastic layer of the gear teeth, and step 110 may be omitted. It should be appreciated that other considerations such as packaging space may influence whether step 110 is to be carried out.

Accordingly, the present invention provides a simple yet effective target wheel that has low complexity, is low cost, and is lightweight.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:
1. A speed target wheel comprising:
an annular body portion consisting of a plastic material; and
a plurality of gear teeth projecting from the annular body portion and each of plurality of gear teeth including a base portion adjacent the annular body portion and a tip portion adjacent the base portion, wherein the base portion is integrally formed with the annular body portion and comprises the plastic material, and wherein each tip portion includes a ferrous region consisting of a single ferrous member integrally encompassed by the plastic material, wherein the ferrous region is included in each of the gear teeth in an amount and is disposed at a location that is effective to generate a signal in a Hall effect sensor disposed for reading the movement of the ferrous region such that the signal generated by any one of the gear teeth is substantially identical to the signal generated by any other of the gear teeth, and wherein the plurality of gear teeth have a predefined width, and wherein each ferrous member has a length that is approximately the same as the predefined width.

2. The speed target wheel of claim 1 wherein the ferrous region of the plurality of gear teeth is disposed adjacent an outer radial surface of the tip portion of the plurality of gear teeth.

3. The speed target wheel of claim 1 wherein the ferrous member is cylindrically shaped.

4. The speed target wheel of claim 3 wherein the ferrous member is the size of the tip portion of each of the plurality of gear teeth.

5. The speed target wheel of claim 1 wherein an outer surface of each ferrous member is partially exposed at an outer radial portion of the speed target wheel at the tip portion of each of the plurality of gear teeth.

6. The speed target wheel of claim 1 further comprising a plurality of ferrous particles interspersed in the plastic material of the plurality of gear teeth.

7. The speed target wheel of claim 6 wherein at least a portion of the plurality of ferrous particles is exposed along an outer surface of the gear teeth.

8. The speed target wheel of claim 1 wherein the body portion includes a smooth inner surface for press fitting on a shaft.

9. The speed target wheel of claim 1 wherein the annular body portion is free of magnetic material.

10. A speed target wheel comprising:
    an annular body portion consisting of a plastic material; and
    a plurality of gear teeth projecting from the annular body portion and each including the plastic material and a single ferrous member, wherein the plastic material is integrally formed with the body portion and the single ferrous member is disposed adjacent an outer radial surface of the speed target wheel and is at least partially integrally encompassed by the plastic material of the plurality of gear teeth,
    wherein the ferrous member is included in each of the gear teeth in an amount and is disposed at a location that is effective to generate a signal in a Hall effect sensor disposed for reading the movement of the ferrous member such that the signal generated by any one of the gear teeth is substantially identical to the signal generated by any other of the gear teeth,
    wherein the single ferrous member has a length that is approximately the same as a width of each of the plurality of gear teeth.

11. The speed target wheel of claim 10 wherein the ferrous member is cylindrically shaped.

12. The speed target wheel of claim 10 wherein an outer surface of each ferrous member is partially exposed at an outer radial portion of the speed target wheel at the plurality of gear teeth.

13. The speed target wheel of claim 10 further comprising a plurality of ferrous particles interspersed in the plastic material of the plurality of gear teeth.

14. The speed target wheel of claim 13 wherein at least a portion of the plurality of ferrous particles is exposed along an outer surface of the gear teeth.

15. The speed target wheel of claim 12 wherein the annular body portion is free of magnetic material.

16. A method of manufacturing a speed target wheel, the method comprising:
    providing an injection molding form having a body form portion and a tooth form portion for creating an annular speed target wheel, the tooth form portion having a width;
    inserting a ferrous member into the tooth form portion of the injection molding form wherein the ferrous member consists of a single ferrous object having a length that is approximately the same as the width of the tooth form;
    injecting plastic into the injection molding form to create an annular plastic target wheel having gear teeth with embedded the ferrous member; and
    removing the annular plastic target wheel from the injection molding form.

17. The method of claim 16 further comprising removing an outer portion of the gear teeth to expose the embedded ferrous material.

18. The method of claim 16 further including magnetizing the injection molding form to place the ferrous material in a desired location.

* * * * *